March 28, 1961 B. HOWARD 2,977,413
KEYBOARD OPERATED TELEGRAPH TRANSMITTER
Filed July 1, 1957 5 Sheets-Sheet 1

INVENTOR.
BERNARD HOWARD
BY
*James and Franklin*
ATTORNEYS

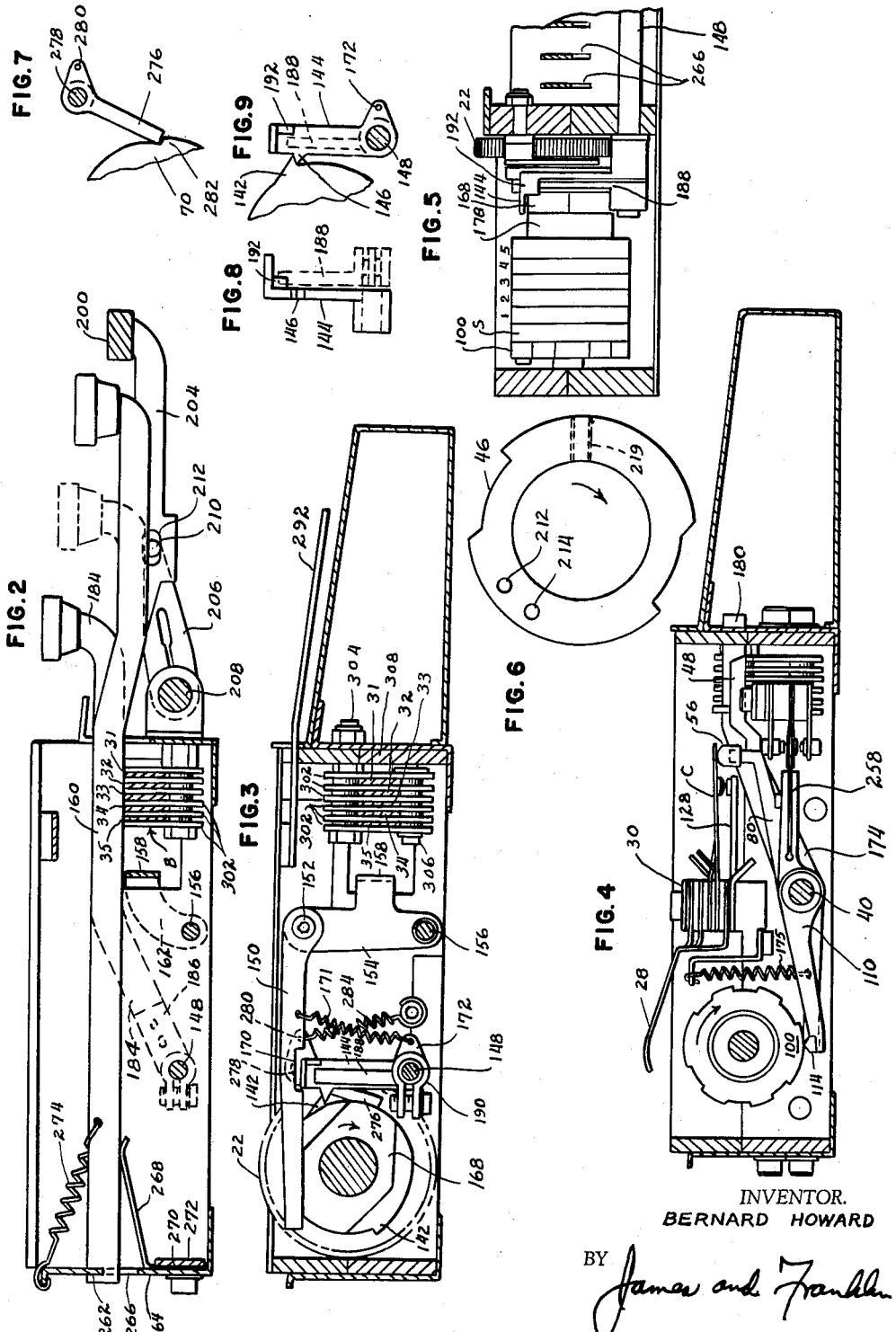

March 28, 1961     B. HOWARD     2,977,413
KEYBOARD OPERATED TELEGRAPH TRANSMITTER
Filed July 1, 1957     5 Sheets-Sheet 3
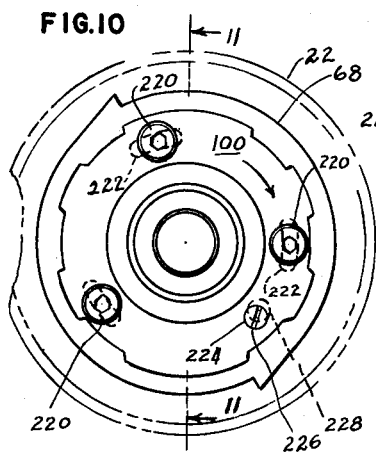
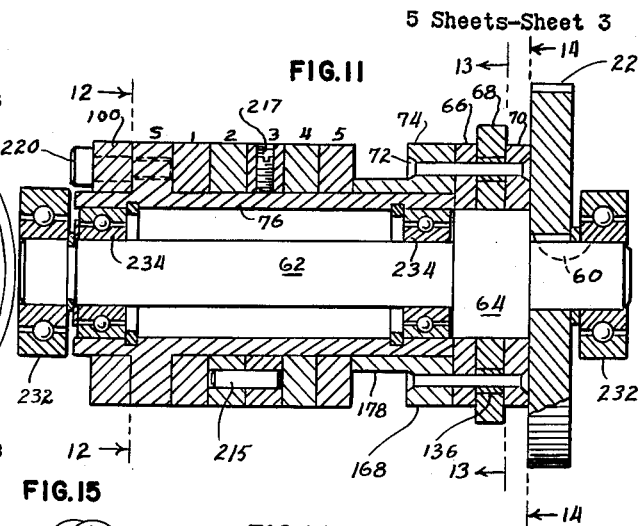
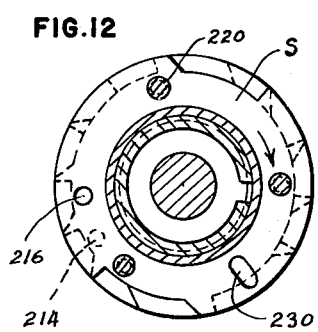
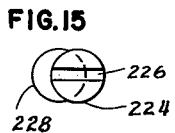
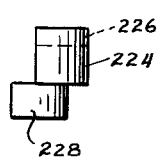
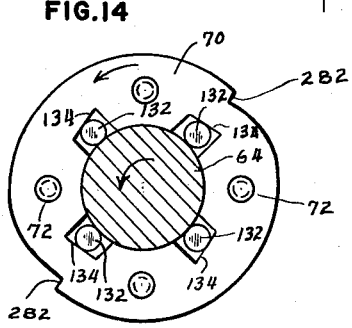
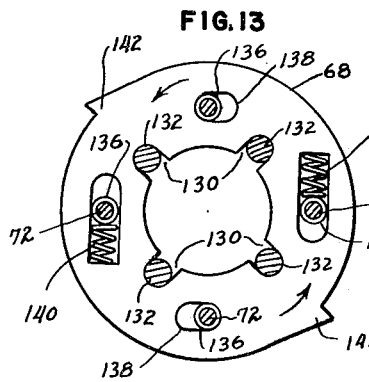
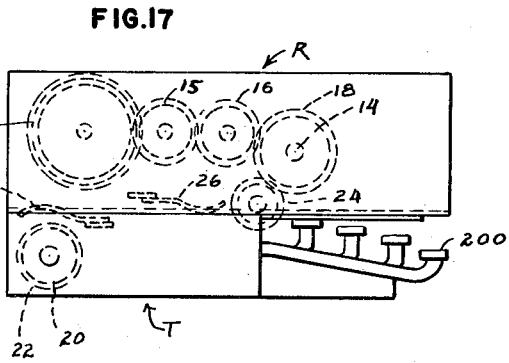
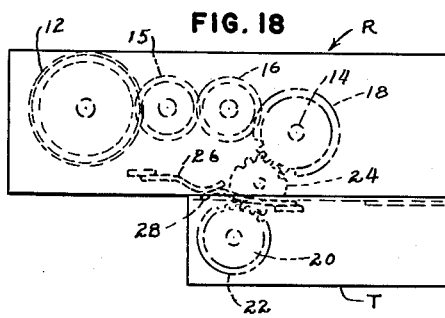
INVENTOR.
BERNARD HOWARD
BY James and Franklin
ATTORNEYS

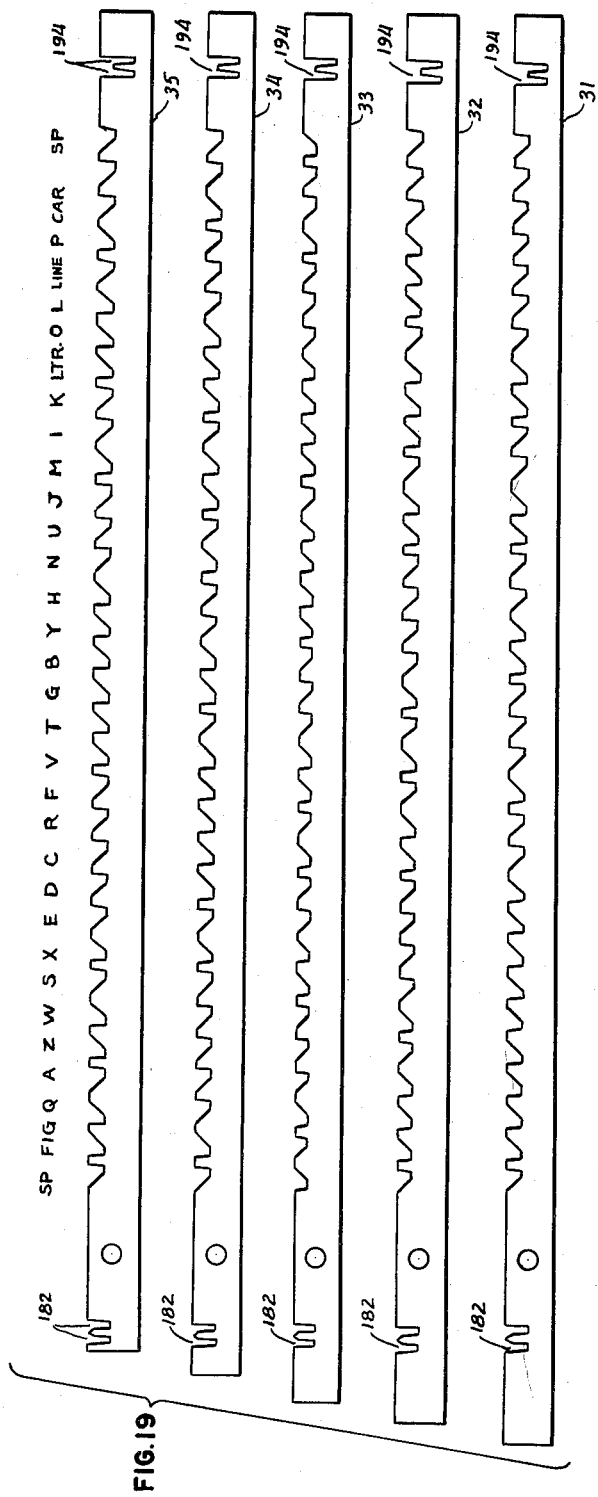
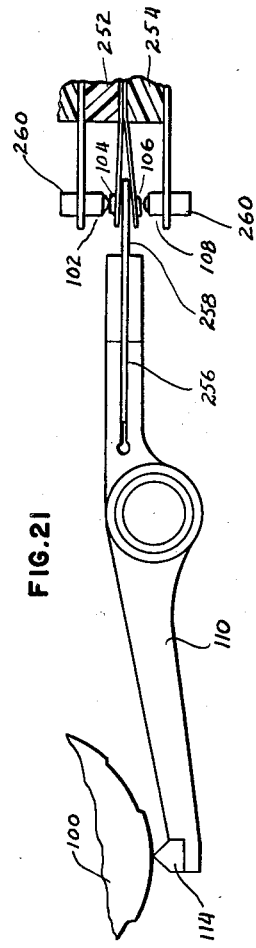
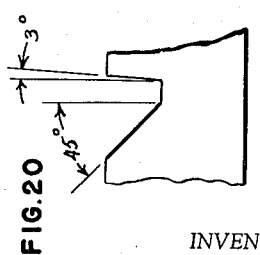

March 28, 1961  B. HOWARD  2,977,413
KEYBOARD OPERATED TELEGRAPH TRANSMITTER
Filed July 1, 1957  5 Sheets-Sheet 5
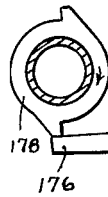
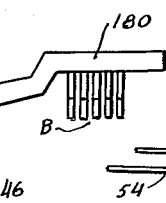
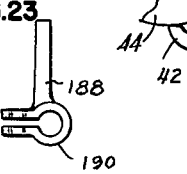
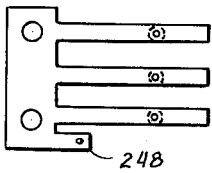
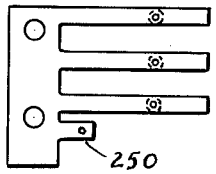
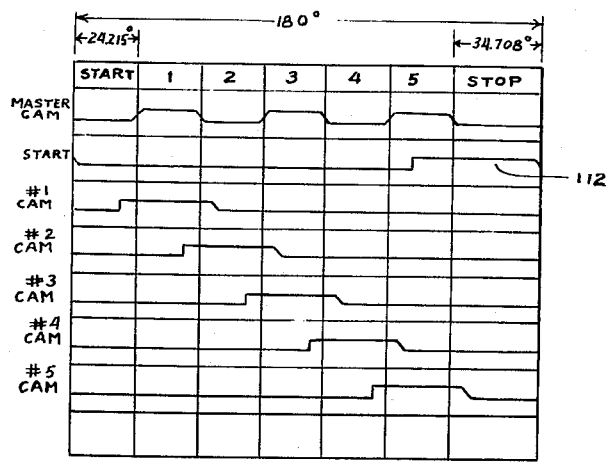
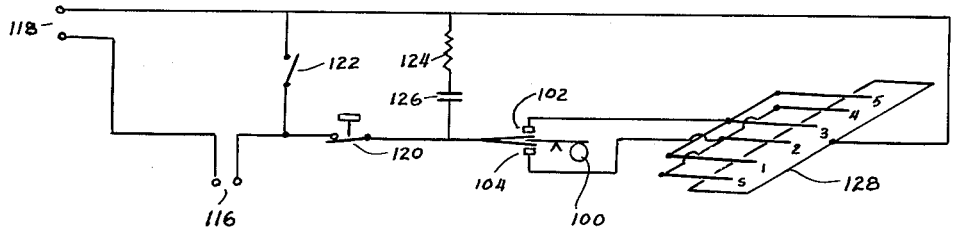
INVENTOR.
BERNARD HOWARD
BY James and Franklin
ATTORNEYS

United States Patent Office 2,977,413
Patented Mar. 28, 1961

2,977,413

KEYBOARD OPERATED TELEGRAPH TRANSMITTER

Bernard Howard, Ramsey, N.J., assignor to Teleprinter Corporation, Hackensack, N.J., a corporation of New Jersey Filed July 1, 1957, Ser. No. 669,098

10 Claims. (Cl. 178—17)

This invention relates to telegraph transmitters, and more particularly to a keyboard operated transmitter for a printing telegraph system.

The primary object of the present invention is to generally improve keyboard telegraph transmitters. A more particular object is to provide an improved transmitter intended to be used with a receiver or printer of the type disclosed in my U.S. Patent 2,769,029, granted October 30, 1956, and entitled "Telegraph Printer." The transmitter is designed to be compactly slidably related to the printer in a manner generally described in my copending application Serial No. 596,294, filed July 6, 1956, now Patent No. 2,929,872, issued March 22, 1960, and entitled "Telegraph Printing Apparatus." The printer with which the transmitter is combined may be improved in accordance with improvements disclosed in my copending applications Serial No. 637,184, filed January 30, 1957, and entitled "Multiple Clutch"; Serial No. 651,931, filed April 10, 1957, now Patent No. 2,918,527, issued December 22, 1959, and entitled "Selector for Telegraph Printer"; and Serial No. 662,371, filed May 29, 1957, now Patent No. 2,913,089, issued November 17, 1959, and entitled "Type Writing Machine."

To accomplish the foregoing general objects, and other more specific objects which will hereinafter appear, my invention resides in the telegraph transmitter elements and their relation one to another as are hereinafter more particularly described in the following specification. The specification is accompanied by drawings in which:

Fig. 2 is a transverse section taken approximately in the plane of the line 2—2 of Fig. 1;

Fig. 3 is a transverse section taken approximately in the plane of the line 3—3 of Fig. 1 with the keys omitted;

Fig. 4 is a section taken approximately in the plane of the line 4—4 of Fig. 1;

Fig. 5 is a section taken approximately in the plane of the line 5—5 of Fig. 1;

Fig. 6 shows a timing cam;

Fig. 7 shows a back stop forming a part of the clutch of the transmitter;

Figs. 8 and 9 show a stop finger causing limited rotation of the clutch;

Fig. 10 is an end view of a clutch driven timing cam assembly;

Fig. 11 is a longitudinal section through the assembly taken in the plane of the line 11—11 of Fig. 10;

Fig. 12 is a transverse section taken on the line 12—12 of Fig. 11;

Fig. 13 is a transverse section taken on the line 13—13 of Fig. 11;

Fig. 14 is a transverse section taken on the line 14—14 of Fig. 11;

Figs. 15 and 16 show an eccentric adjusting device for the master pulsing cam;

Figs. 17 and 18 are explanatory of the slidable relation between the transmitter and the receiver for compactness and portability;

Fig. 19 shows the notched code bars which respond to depression of a key of the keyboard;

Fig. 20 is a detail of a notch in a code bar;

Fig. 21 shows the relation between the master pulse cam and the precision contacts operated thereby;

Fig. 22 shows a code bar lock mechanism;

Fig. 23 shows a finger forming a part of the repeat mechanism;

Fig. 24 shows the relation between a timing cam and a transmission contact controlled thereby;

Figs. 25, 26 and 27 show the construction of the transmission contacts;

Fig. 28 is a diagram explanatory of the timing relationship of the master pulse cam and the timing cams;

Fig. 29 is a wiring diagram for the transmitter; and

Fig. 30 is explanatory of the precise timing sought for the transmitter.

Figure 1:
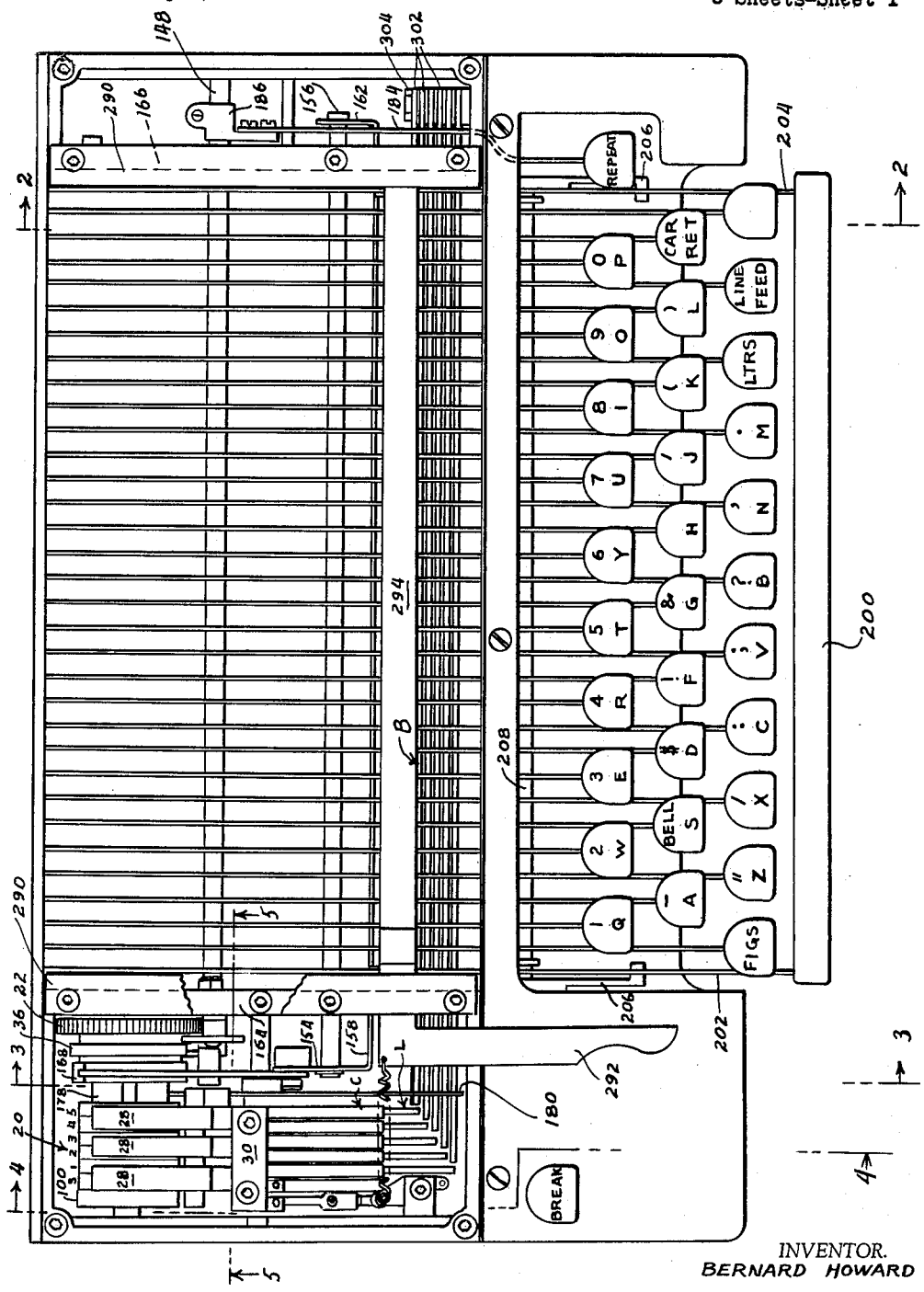
Fig. 1 is a plan view of a telegraph transmitter embodying features of my invention.

Referring to the drawing, and more particularly to Figs. 17 and 18, the transmitter, generally designated T, is disposed beneath a receiver, generally designated R. The overall width of the transmitter including the keyboard is substantially the same as that of the receiver when the parts are superposed as shown in Fig. 17. At this time the keyboard is inaccessible, and the parts are left in this relation for compactness during transportation. However, when the transmitter is to be used it is slid from the position shown in Fig. 17 to that shown in Fig. 18, thus exposing the keyboard.

The receiver contains a motor with reduction gearing generally designated 12, which runs in synchronism with a motor at one or more remote stations. The telegraphic connection between stations may be either by wire or radio. The motor 12 drives a master cam shaft 14 forming a part of the receiver, and the drive may be in any desired fashion as by means of intermediate gears 15 and 16 meshing with a gear 18. The transmitter T requires no motor of its own, and instead uses the motor 12. For this purpose, its timing cam assembly, generally designated 20, is provided with a gear 22, and the receiver has an idle gear 24 meshing with gear 18. In Fig. 17, the gears 22 and 24 are out of mesh, but when the transmitter is slid forward to the working position shown in Fig. 18, the gears 22 and 24 come into mesh, so that the motor 12 then drives the cam assembly 20.

For electrical connection between the parts, the receiver may be provided with a group of resilient electrical contacts 26, and the transmitter has mating contacts 28. There are three such contacts, best shown in Fig. 1. These come into engagement with contacts 26, as shown by the change from Fig. 17 to Fig. 18.

The arrangement so far described is not claimed herein, it being disclosed and claimed in my copending application Serial No. 596,294 mentioned above.

Referring now to Fig. 1 of the drawing, the cam assembly 20 is shown in the upper left hand corner, and is driven by the gear 22 previously mentioned, through a limited rotation clutch, the latter being engaged each time a key is depressed. The cam assembly is largely obscured by the resilient contacts 28, insulatedly mounted at 30.

The transmitter comprises an array of keys clearly shown in Fig. 1, and a plurality, in this case five, of notched parallel code bars shown below the arrow B. These bars are used in edgewise position. They are shown flat and spread apart in Fig. 19, where they are sequentially numbered 31, 32, 33, 34, 35, and it will be understood that on depression of a key, the lever portion thereof is received in the aligned notches of the bars and causes them to assume left or right hand positions, in combinations which correspond to the desired character to be transmitted. In the present specification, for convenience, the term "key" is used to designate both the finger tab and the lever, so that one may speak of the key engaging the notches to shift the code bars.

Reverting to Fig. 1, the limited rotation clutch is a half revolution clutch in the particular mechanism here illustrated, it being located at 36 adjacent the gear 22, and when engaged, the clutch serves to drive a series of coaxial timing cams 20. There are code levers, only the ends of which are visible in Fig. 1, at the left of the arrow L, and these are disposed for cooperation with both the timing cams 20, and the code bars B, each code lever cooperating with a mating code bar. The timing cams are rotatably displaced from one another, as will be described later. There are electrical contacts, generally designated C, which are controlled by the code levers L, and the arrangement is such that the operation of one of the electrical contacts requires the favorable coincidence of both a timing cam 20 and a code bar B.

This may be explained with reference to Fig. 24 of the drawing, which shows a code lever L pivoted at 40, and having a cam follower portion 42. This cooperates with a timing cam 44 having a drop at 46. The opposite end 48 of the code lever is adjacent and sometimes overlies the end 50 of a mating code bar.

Reverting to Fig. 1, it will be seen that the code levers L are of progressively different lengths, and similarly for the code bars B, so that the end of each code bar is adjacent a companion code lever. In Fig. 1, all of the code bars are shown in their right hand position, thus freeing all of the code levers for downward movement. The motion of the code bars is such that when a code bar is in its left hand position, it underlies the end of its mating code lever, and thus will prevent downward movement of the same.

Reverting now to Fig. 24, a movable electrical contact 52 cooperates with a stationary contact 54. The movable contact overhangs the stationary contact, and rests on an insulated button 56 secured to a part 58 of the code lever. The dimensioning of the parts is such that the contacts are held open by the code lever when the free end of the code bar 50 is beneath the free end of the code lever 48 (that is, when the code bar is in its left hand position in Fig. 1). When the code bar is in its right hand position in Fig. 1, the code lever can move down, permitting the contacts (Fig. 24) to close, provided that the cam drop 46 is at the cam follower 42. Inasmuch as the cam 44 is a timing cam, this means that the code lever can function only at the time interval apportioned to it. The contacts are normally biased toward closed. They are shown to the left of arrow C in Fig. 1.

In the present case, we deal with a five-unit or so-called "five level" code. The signal period of any one character is divisible into seven intervals, which may be designated "Start," "One," "Two," "Three," "Four," "Five," and "Stop." As is customary, the telegraph line is normally energized, and "start' is always signified by opening the supply of current to the line. Conversely, "stop" is always signified a closed circuit to the line. In the five intervening periods, the line may be either closed or open, and the combinations correspond to the characters to be transmitted. The "stop" interval usually is longer than the others, and in the present case, at a transmission rate of sixty words per minute, the intervals are each 22 milliseconds long, except for the stop interval, which is 31 milliseconds. However, the present transmitter is capable of much faster transmission than sixty words per minute. This is controlled by the speed of the driving motor 12 (Figs. 17, 18) and the equivalent motor at the remote station.

The timing cam assembly is shown in Fig. 11, and referring to that figure, gear 22 is keyed at 60 to a shaft 62 having a clutch driving portion 64. Driven parts of the clutch, shown at 66, 68 and 70, are riveted at 72 to a collar 74 fixedly secured to a sleeve 76 on which the timing cams are mounted. These cams are marked S, 1, 2, 3, 4, 5. The first cam is for start and stop, and the other cams are for the five units of the code, and they control the corresponding five code levers L in cooperation with the five code bars B, as previously described.

Reverting to Fig. 24, the five code levers have the configuration there shown, and differ from one another solely in a slight progressive difference in length at the free ends 48. There is another lever controlling another transmission contact in response to the start-stop cam, and this lever has the same configuration as shown in Fig. 24, except that it may terminate at the insulation button 56, that is, at the broken line 78. This is shown in Fig. 25 by the lever 80, only the right hand end of which is shown.

The transmission is preferably precisely timed. Referring to Fig. 30, if the closed circuit or "marking" intervals are slightly shorter than the open circuit or "spacing" intervals, and if there are successive marking units as shown at 82, 84 and 86, an undesired space will appear between marks. This is called "spacing bias." If the marking intervals are slightly longer than the spacing intervals, there will be an overlap, as shown at 88, 90, 92. This is called "marking bias." The ideal timing is that shown at 94, 96, 98, in which the marking and spacing intervals are exactly equal, and so perfectly timed that successive marking units provide a continuously closed circuit.

To accomplish this with an array of timing cams as so far described is difficult and costly. The six cams must not only be perfectly shaped, but must be perfectly related to one another. Equally important, each cam must be properly related to its follower lever, and the latter to its electrical contact. A slight shift or bend of an electrical contact becomes equivalent to a change at the cam. Moreover, there may be unequal wear at the cams, at the followers, and at the contacts.

To help solve this problem, I employ timing cams which provide a rough exaggerated timing, and I additionally provide a master pulse cam 100 (Figs. 4, 10, 11 and 21). This operates precision contacts which are connected electrically in series with the timing contacts. More specifically, as best shown in Fig. 21, there are two pairs of precision contacts, 102, 104, and 106, 108, and a cam follower lever 110, which constitutes a means whereby the master pulse cam 100 alternately operates the contacts 104 and 106. The contacts 102 and 108 are stationary. One or the other is engaged at all times.

Referring now to Fig. 29, the contact 102 is connected in series with alternate timing contacts, that is, three of the six timing contacts marked 1, 3, 5, while the contact 108 is connected in series with the intermediate timing contacts, marked S, 2 and 4. The master pulse cam 100 and its associated precision contacts provide a more precise timing which substantially avoids spacing bias and marking bias, that is, they help obtain a more perfect signal with substantially zero bias.

The cam relationship sought is illustrated diagrammatically in Fig. 28 of the drawing. In this figure, the code units are shown at 1, 2, 3, 4 and 5, while the start and stop units also are appropriately headed. As here illustrated, the clutch is a half revolution clutch, and all cams are symmetrical, so that the plot shown in Fig. 28 is for 180 degrees rotation. The diagram repeats itself for the second half rotation. The intervals are 24.215 degrees, except for the stop interval which is 34.708 degrees. These intervals are represented by the vertical lines. The cam drop for the number 1 cam may start well ahead, and may stop well behind, the vertical lines representing the precise No. 1 interval. Indeed, as here illustrated, the rough cam interval is about 45 degrees, compared to the precise interval of 24.215 degrees. Similar remark applies to the remaining cams, and also to the start-stop cam. The drop 112 of the start-stop cam begins about 15 degrees ahead of time, but the termination of this is exact, for a reason explained later.

The reason it is preferred to use a precision cam which alternately operates two contacts will be clear from inspection of the top cam line of Fig. 28, which corresponds to the master cam. The beginning of one mark or space is coincident in time with the termination of the preceding mark or space, and thus there would be no room around the periphery of a single master cam for action in a single direction. It would be possible to use two master cams, thus providing ample space between cam drops having a one-way action, but I prefer to provide a single master cam with a two-way action. The cam drop is slight, and has been exaggerated in the drawing for clarity. It is only one hundredth of an inch. The contacts operated thereby are correspondingly precise.

Reverting to Fig. 21, it will be seen that the cam drops in master cam 100 terminate in exactly ground sloping surfaces. These mate with accurately formed sloping surfaces of a hardened cam follower block 114. By accurate adjustment of the electrical contacts, they may be made to close or open with accurate timing, and in Fig. 28, it will be seen that the sloping ends of the cam drops exactly straddle the vertical lines which indicate the desired time intervals.

Reverting now to the wiring diagram shown in Fig. 29, the purpose of the transmitter is to control the supply of power from a suitable source connected at 116, to a line connected at 118. This may be a telegraph line or a radio circuit. During transmission, the "Break" key 120 is closed, and the "Send-Receive" switch 122 is open. The resistor 124 and capacitor 126 are merely an RC circuit for spark suppression. The timing contacts are all depressible to engage a common plate or large contact 128, thus closing the circuit from source 116 to line 118.

It will be evident that each timing contact can close only during its allotted interval, because of the action of the timing cams, and then will close or remain open depending on whether there is to be a mark or a space, as determined by the code bars in response to the keys of the keyboard. A master pulse timer, if operating on a single precision contact, would require merely that the precision contact be in series with all six of the timing contacts. Excess or exaggerated closing of a timing contact, with overlapping closings, as shown in the lower portion of Fig. 28, would be of no consequence, because actual transmission would additionally require closing of the precision contact. When, as here, the precision timing is divided between two contacts shown at 102 and 108, which are operated alternately, each contact is connected in series with three of the six timing contacts, and these are the alternate ones and the intermediate ones, in order to properly allocate the operations of the master contacts with the timing contacts.

A single master cam as here used is capable of controlling an even number but not an odd number of intervals. In the present case, it controls the five units of the code, and it starts the "stop" interval, and it stops the "start" interval. The termination of the "stop" period which is also the beginning of the "start" period, is determined by the termination of the cam drop 112 of the start-stop cam. All other timing is controlled by the master cam. In Fig. 28, the termination of cam drop 112 exactly straddles the vertical lines for zero and 180 degrees.

The clutch is preferably of the type disclosed in my copending application Serial No. 637,184, filed January 30, 1957, and entitled "Multiple Clutch." Referring to Figs. 10, 11, 13, the clutch comprises a cage disc 68 which is notched at 130 to receive clutch rollers 132 (Fig. 13). The cage disc 68 is enclosed on opposite sides by housing discs 66 and 70 (Figs. 11 and 14). These have sloping or wedge surfaces 134 (Fig. 14) within which the aforesaid rollers 132 are received. These rollers are in contact with the continuously rotating drive portion 64 of the clutch, and it will be evident that the rollers are automatically moved into engagement, and thus cause the housing discs 66 and 70 to turn with the drive portion 64 of the clutch. The through rivets 72 are connected to collar 74 (Fig. 11) and sleeve 76 carrying the timing cams. Spacer tubes 136 (Figs. 11 and 13) are fitted around the rivets 72, and are slightly longer than the thickness of cage disc 68, thus affording movement of the latter relative to the housing discs 66 and 70. For this purpose, the cage disc has slots 138 (Fig. 13) which afford relative movement, and two of the slots are further elongated to receive small compression springs 140 which tend normally to engage the clutch by moving the cage disc in that direction which moves the clutch rollers against the wedge surfaces.

However, the cage disc 68 has stop teeth 142 for cooperation with a clutch stop finger, and it will be evident that when the cage disc is held back, the clutch rollers are moved to the high or free end of the wedge surfaces, thus disengaging the clutch and arresting further movement. By providing two stop teeth, as shown in Fig. 13, the clutch becomes a half revolution clutch.

The action of the stop finger is shown in Fig. 9, in which the stop finger 144 having a tooth 146 engages the tooth 142 of the clutch. The location of these parts in the complete transmitter is shown in Fig. 3 of the drawing, with stop finger 144 bearing against clutch tooth 142. The finger is freely oscillatable about a shaft 148.

If desired, the clutch may be provided with a so-called back stop or anti-chatter means. A back stop for this purpose is best shown in Fig. 7, it comprising a finger 276 pivoted at 278, and normally urged toward a cage disc 70 of the clutch by means of a pull spring connected at 280. Referring to Fig. 14 of the drawing, the housing disc 70 has diametrically opposite stop surfaces 282. These face in a direction opposite to the teeth 142 in Fig. 13. Only one housing disc need be provided with the stop surfaces 282, but for simplicity of manufacture, both discs may be made alike. The relation of the back stop 276 to the housing disc is shown in Fig. 3, in which a part of the back stop is visible at 276. It is pivoted at 278, and pull spring 284 is connected to the back stop at 280. The positions of the ends of the clutch stop finger 144 and the back stop 276 are so related as to keep the clutch rollers at the high ends of the wedge slots when the clutch is disengaged. The back stop is a refinement which is more fully explained in my copending application Serial No. 637,184 previously referred to.

The stop finger may be pulled to the right by notch 170 in a pull link 150 pivoted at 152 on the upper end of an upright lever 154, the lower end of which is pivoted at 156. This lever 154 has an offset arm carrying a clutch release bar 158, which bar extends all the way from one side of the keyboard to the other beneath all of the keys. Thus, in Fig. 2, the key 160 is disposed immediately over the clutch release bar 158, and the same is true of the other keys. Referring to Fig. 1, the clutch release bar 158 extends from upright lever 154 at its left end all the way to a support 162 at the other end. Both of these are pivoted on a rod 156 which similarly may extend from one end to the other. The rod is carried in bearings formed in bearing walls 164 and 166.

Reverting now to Fig. 3, it will be evident that on depression of any key, the clutch release bar 158 is moved down, thus causing the notch 170 in pull link 150 to pull the stop finger 144 to the right, thereby engaging the clutch as an incident to each depression of a key.

Of course the clutch should be disengaged after a half revolution even if the operator holds the key depressed overlong. The present transmitter is therefore provided with additional means, specifically a cam 168, best shown in Fig. 3, which is driven by the clutch to help restore the stop finger 144 preparatory to again disengaging the clutch after its half revolution. From inspection of Fig. 3, it will be seen from the shape of cam 168 that it immediately raises the pull link 150, thus freeing the upper end of stop finger 144 from the notch 170 in pull link 150, thereby freeing the stop finger for movement back toward the clutch under the influence of a pull spring 171 which is connected to the ear 172. This spring also pulls link 150 down.

Another thing which happens immediately upon depression of a key is that the code bars are locked in position during most of the limited or half revolution of the clutch, and regardless of whether or not the key is held depressed. This is a converse situation, that is, the code bars are held in position no matter how quickly the key is released after being depressed. For this purpose, I provide a lock means or lock lever 174, best shown in Fig. 22. This is pivoted on the pivot shaft 40 previously referred to, and it has a spring 175 and a cam follower 176 cooperating with a cam 178. The cam shape is such that the moment the cam assembly begins to turn, the lever (which I term a "prevent lever") moves clockwise, permitting the locking portion 180 thereof to move into mating notches in the five code bars B.

Referring now to Fig. 19, it will be seen that each of the code bars has a pair of notches 182 at its left end, and these are all in alignment, thus permitting the "prevent" or lock lever (180 in Figs. 4 and 22) to move into one notch or the other, depending on whether the code bar is in its left or its right position.

There is one condition under which it is desired to intentionally keep the clutch in engaged position. Referring to Fig. 1, it will be seen that there is a "Repeat" key at the right end of the keyboard. Its lever 184 extends to a repeat shaft 148, and is fixedly secured thereto, as by means of a suitable fitting 186. The shaft 148 extends to the opposite end of the transmitter, and is supported by the bearing walls 164 and 166.

Fig. 2 shows how the repeat key lever 184 passes over the clutch release bar 158, and then curves downward to fitting 186 which is clamped on the repeat shaft 148. Referring next to Fig. 3, the other end of shaft 148 has secured thereto a means 188, in this case an upright finger with a slit collar 190, the latter being tightly clamped on shaft 148.

The parts 188, 190 are more clearly shown in Fig. 23, and the relation of this means to the clutch stop finger is shown in Figs. 8 and 9, with the clutch stop finger 144 shown in solid lines, while the repeat finger 188 is shown in broken lines. The stop finger has an abutment 192 adjacent the repeat finger 188, and it will be understood that when the latter is moved to the right as seen in Figs. 3 and 9, it moves the stop finger to the right and holds it in released position for so long as the "Repeat" key is held down. This produces continued rotation of the clutch for repeated transmission of the same character.

The transmitter is provided with still further locking means to lock the code bars against any possibility of movement during repeat transmission, that is, as long as the "Repeat" key is held down. Reverting to Figs. 1 and 2, the repeat key 184 overlies the code bars B. Referring now to Fig. 19, each of the code bars has a pair of notches 194 near its right end. These notches are all in alignment and are disposed directly beneath the "Repeat" key. The latter enters one notch or the other, depending on whether the code bar is in its left or right position, and thus the code bars are held against movement during the ensuing rapid motor-driven repetition of a single character.

The keyboard includes a spacer bar shown at 200 in Figs. 1 and 2. This is carried by spacer levers 202 and 204 at its ends, and the said levers overlie the code bars B, the same as do the keys. Referring now to Fig. 19, the characters corresponding to the notches are indicated by the lettering at the top of the drawing. At each end, the letters "SP" correspond to code bar positions which signify "spacing," and it will be seen that identical notches for this purpose are provided at both ends of each code bar. Fig. 20 is a detail of a notch. These notches underlie the spacer levers 202, 204, and depression of the spacer bar positions the code bars at both ends. Thus, the spacer bar would function even if depressed at only one end.

Nevertheless, I prefer to provide additional means to insure parallel motion of the spacer bar, or in other words, to insure simultaneous equal movement of both ends of the spacer bar. Referring to Fig. 2 of the drawing, a support arm 206 is pivoted on a rod 208. Its other end carries a pin 210 received in a slot 212 in the spacer lever 204. A similar support arm is provided at the other end for spacer lever 202, and in Fig. 1, said support arms 206 are shown at both ends of the keyboard. Both arms 206 are fixedly secured to a common rod 208 which extends from one end of the keyboard to the other. Thus, the rod 208 causes equal movement of the support arms 206, with consequent equal movement of the spacer levers 202 and 204 at both ends of the spacer bar 200.

The timing cams 1, 2, 3, 4, 5 are here made all alike, and are molded out of nylon. The shape of a timing cam is shown in Fig. 6, and each cam is provided with a pair of holes 212, 214, which are spaced apart exactly the amount of the desired rotative displacement of the cams, in this case, 24.215 degrees. The cams are alike, and consequently the displacements of the holes from the cam drop 46 are alike. The cams are connected to one another by short steel pins which pass through the holes 212, 214, and which have a length no greater than the thickness of two cams.

One of these short steel pins is shown at 215 in Fig. 11, connecting timing cams 2 and 3. This figure also shows a set screw 217 which may be used to additionally tighten the cam on the sleeve 76. Each of the cams has a threaded hole shown at 219 in Fig. 6 to receive such a set screw. By putting a pin through hole 212 of one cam and hole 214 of the next cam, the two cams are displaced by the desired amount. By putting the next pin through the hole 212 of the second cam and hole 214 of the third cam, these cams are progressively displaced, and so on through the entire assembly of cams. Thus, the cams may be made exactly alike, and yet the problem of relative orientation is readily taken care of.

The start-stop cam S (Figs. 11 and 12) is preferably made of steel, and may be made integral with the sleeve 76 as here shown. It has a hole 216 (Fig. 12) which receives one of the aforesaid short steel pins which passes through the first nylon cam number 1. The other hole of the nylon cam is shown at 214. The cam drops of cam S are shown in solid lines in Fig. 12, while the progressively oriented drops of the nylon cams are shown in dotted lines.

The master pulsing or precision cam 100 is secured to the start-stop cam S by means of three screws indicatd at 220 in Figs. 10 and 11. The position of the master cam is preferably adjustable relative to the start-stop cam, and relative to the clutch. For this purpose, each of the screws 220 passes through a slot in the master cam 100, as indicated at 222, thus affording rotative adjustment. Moreover, to facilitate such adjustment, an eccentric or crank-like member may be provided. This is shown to enlarged scale in Figs. 15 and 16. It has a spindle portion 224 with a screw slot or other such means 226 to facilitate rotation. It also has an offset or crank portion 228. The latter is received in a radial slot 230 (Fig. 12) in the start-stop cam S. The spindle portion 224 is rotatably received in a mating hole in the master cam 100, as shown in Fig. 10. It will be evident that after slightly loosening screws 220, the position of the master cam may be adjusted by rotation of member 224, following which the adjusted position may be locked by again tightening the screws 220.

In Fig. 11, it will be understood that the anti-friction bearings 232 carry the continuously rotating shaft 62 to which the drive gear 32 is keyed. This in turn has anti-friction bearings 234 which carry the sleeve 76 and its cam assembly. The bearings 232 are received in appropriate supports, one of which is the bearing wall 164 previously referred to, and the other of which is a part of the end wall of the keyboard. Snap rings are received in grooves to prevent axial movement of the parts of the assembly.

In connction with Fig. 29 it was explained that the timing contacts are divided into two groups of three each. The manner in which this is done will be clear from inspection of Figs. 25, 26 and 27. Fig. 26 shows a contact plate forming three of the upper or movable contacts. Fig. 27 shows another contact plate forming the other three of the movable contacts, and it will be observed that these contacts are displaced relative to one another, so that the contacts on one plate are received in the spaces between the contacts of the other plate. Also, the base end 236 (Fig. 25) of one plate is left straight, but the base end 238 of the other plate is elevated somewhat, so that an insulator 240 may be positioned therebetween. There are additional insulators 242, 244, and 246, with the large stationary contact plate 128 positioned between insulators 244 and 246. These parts are all secured together, and the nest of insulators is located at numeral 30 in Fig. 1. Reverting to Figs. 26 and 27, one of the contact plates has a soldering lug 248, while the other has a displaced soldering lug 250, thus affording separate connections thereto, as described in connection with Fig. 29.

The master pulsing contacts are best shown in Figs. 4 and 21 of the drawing. Movable contacts 104 and 106 are formed on thin resilient strips, the stationary ends of which are clamped between insulators 252, 254. The cam follower lever 110 is split at 256 to receive a thin strip of insulation 258. The contacts 104, 106 are spread apart slightly to receive the strip 258 therebetween. The stationary contacts 102 and 108 are each carried on adjusting screws 260, thereby affording a precise adjustment of the timing of the master pulsing action. One opens as the other closes, in response to a slight movement, say one hundredth of an inch, at the cam.

The manner in which the keys are pivoted may be described with reference to Fig. 2 of the drawing. The rear end of each key has a notch 262. The rear wall 264 of the keyboard has a series of slots 266 to receive the individual keys, a few of these slots being shown at the right end of Fig. 5. The keys are held upward by leaf springs 268 (Fig. 2), and all of these springs may be formed integrally with a back piece 270 held against the back wall 264 by a support strip 272. Each key may be additionally provided with a pull spring 274 to help raise it. Either spring could be used alone. The springs have been omitted in Fig. 1 in order not to unnecessarily complicate the drawing. It will be understood that the slots 266 (Fig. 2) are long enough to permit insertion of the end of a key; that the spring 268 tends primarily to hold the notch and slot interengaged, thereby supporting the key against both lateral and longitudinal movement; that the spring 274 tends primarily to raise the key after it has been depressed, and, finally, that the load on the key represented by the code bars provides a force which itself tends to raise the rear end of the key, and thus to insure continued anchorage at the notch and slot.

The code bars 31, 32, 33, 34, 35 are slidably guided in a manner shown in Fig. 3. Portions of the bars near the ends are received between six upright guide strips 302. The upper ends of these strips are rigidly locked between suitable round spacing washers on a bolt 304 anchored by appropriate nuts. The lower ends of these strips are similarly locked between round spacers or washers on a bottom screw or bolt 306. Both of these bolts may pass through the front plate 308 of the frame, but in the present case only the upper one does. Similar supports are provided at the other end of the keyboard for the other ends of the code bars. The guides or supports 302 for the right hand ends are visible in Fig. 1, but the corresponding guides for the left end are concealed in Fig. 1. It will be evident from inspection of Fig. 3 of the drawing that each code bar is held against sideward movement by the upright guide strips 302, and is held against vertical movement by the round washers or spacers on the upper and lower bolts. The only movement permitted is a longitudinal horizontal movement.

Referring to Fig. 1, the key marked "Break" corresponds to that shown at switch 120 in Fig. 29, and opens the current supply to the line manually. This is done for a suitable interval before starting to transmit, in order to take care of the fact that the receiver may be provided wih automatic stop mechanism which stops the motor of the receiver when there is no signal for a predetermined interval. The somewhat prolonged break caused by depression of the "Break" key starts the motor at the receiver.

Nearly all of the keys shown in Fig. 1 have two characters marked thereon. The lower characters are letters, and the upper characters are here called figures, and comprise numerals in the top row of keys, and punctuation and abbreviations in the remaining keys. The key marked "Figs." initiates a change at the receiver whereby thereafter the figures (numerals etc.) are reproduced. Depression of the key marked "Ltrs." restores the condition at the receiver whereby the letters of the alphabet are reproduced. The key marked "Line Feed" causes a change from one line to the next, and the key marked "Car Ret." causes a carriage return.

It will be noted that these special keys have only a single designation, and that is desirable because no change is wanted as between letters and figures. In other words, carriage return should cause a carriage return regardless of whether one was last transmitting letters or was last transmitting figures, and the same applies to "Line Feed."

The strips or rails marked 290 in Fig. 1 are guide rails which slidably connect the transmitter to the superjacent receiver. The handle 292 is connected to a longitudinally slidable bar 294 which acts to lock the keyboard in either the retracted position shown in Fig. 17, or the exposed position shown in Fig. 18.

The local printer also responds to the keyboard transmission, thus permitting the operator to see the message being sent, as it is sent, and providing a local copy of the message.

The keyboard circuit is in series with the printer signal circuit, and when the keyboard is pushed back into storage position, or is wholly removed from the printer, the contacts on the printer are automatically shorted, thus leaving the printer in circuit, without the transmitter.

The master pulsing cam operates a pair of contacts which accurately determine the timing of transmission, while the five contacts affected by the code bars determine only whether or not each of the pulses is to be transmitted. In this way, the adjustment of the five contacts is made non-critical, and only the single pair of master pulsing contacts require accurate adjustment.

It is believed that the construction and operation of my improved telegraph transmitter, as well as the advantages thereof, will be apparent from the foregoing detailed description. It will also be apparent that while I have shown and described my invention in a preferred form, changes may be made in the structure shown, without departing from the scope of the invention, as sought to be defined in the following claims. In the claims, the term "transmission contacts" is intended to mean the electrical contacts which control the supply of current from a local source to the telegraph line or radio transmitter to cause either a mark or a space.

I claim:

1. A keyboard operated telegraph transmitter comprising an array of keys, transmission contacts, a limited rotation clutch for driving timing cams for operating said transmission contacts in cooperation with said keys, a stop finger for disengaging said clutch, means whereby depression of a key moves said stop finger and so permits engagement of said clutch, and an additional means driven by said clutch to help restore said stop finger preparatory to again disengaging said clutch after said limited rotation of said clutch and regardless of how long the key is held depressed by the operator.

2. A keyboard operated telegraph transmitter comprising an array of keys, notched parallel code bars shiftable by depression of a key, transmission contacts, a limited rotation clutch for driving timing cams for operating said transmission contacts in cooperation with said code bars, a stop finger for disengaging said clutch, means whereby depression of a key moves said stop finger and so permits engagement of said clutch, and an additional cam driven by said clutch to help restore said stop finger preparatory to again disengaging said clutch after said limited rotation of said clutch and regardless of how long the key is held depressed by the operator.

3. A keyboard operated telegraph transmitter comprising an array of keys, a limited rotation clutch including a clutch stop finger, transmission contacts, timing cams driven by said clutch and operating said transmission contacts in cooperation with said keys, a repeat key, and means whereby depression of said repeat key holds said clutch stop finger and permits continued rotation of the clutch for repeated transmission of the same character.

4. A keyboard operated telegraph transmitter comprising an array of keys, notched parallel code bars shiftable by depression of a key, a limited rotation clutch including a clutch stop finger, transmission contacts, timing cams driven by said clutch and operating said transmission contacts in cooperation with said code bars, a repeat key, means whereby depression of said repeat key holds said clutch stop finger and permits continued rotation of the clutch for repeated transmission of the same character, and locking means whereby depression of said repeat key locks said code bars as long as the repeat key is held down.

5. A keyboard operated telegraph transmitter comprising an array of keys, notched parallel code bars shiftable by depression of a key, a spacer bar carried by spacer levers at its ends, spacer notches in said code bars at both ends to receive said spacer levers, whereby depression of the spacer bar positions said code bars at both ends.

6. A keyboard operated telegraph transmitter comprising an array of keys, notched parallel code bars shiftable by depression of a key, a spacer bar carried by spacer levers at its ends, spacer notches in said code bars at both ends to receive said spacer levers, whereby depression of the spacer bar positions said code bars at both ends, and additional linkage for said spacer bar, said linkage comprising a support arm at each spacer lever, and a rod connecting said support arms for simultaneous equal movement, whereby the spacer bar when depressed moves equally at both ends.

7. A code transmitter for transmitting marking and spacing intelligence bits, said transmitter comprising a limited rotation clutch for driving a plurality of timing cams which operate transmission contacts, said timing cams being rotatively displaced relative to one another and providing a roughly exaggerated timing in which the intelligence bits are too long, a master pulse cam having lobes of precision length to provide proper timing in which the intelligence bits are of correct length, there being a plurality of such lobes for cooperation with said plurality of timing cams, means connecting said master pulse cam and said timing cams together so that said master pulse cam is turned by said clutch along with said timing cams, and an accurately adjustable precision contact operated by said master pulse cam, and means connecting said precision contact electrically in series with the aforesaid timing cam contacts, whereby precise timing is obtained with fewer precision parts.

8. A code transmitter for transmitting marking and spacing intelligence bits, said transmitter comprising a limited rotation clutch for driving a plurality of timing cams which operate transmission contacts, said timing cams being rotatively displaced relative to one another and providing a roughly exaggerated timing in which the intelligence bits are too long, a master pulse cam turned by said clutch along with said timing cams, said master pulse cam having high dwell portions and low dwell portions occupying end to end substantially the entire periphery of the cam and being substantially equal in length for substantially equal marking and spacing intelligence bits, and two accurately adjustable precision contacts together with means whereby the high dwell portions of said master pulse cam operate one precision contact and the low dwell portions operate the other precision contact, means connecting one of said precision contacts electrically in series with alternate ones of the timing cam contacts, and means connecting the other of said precision contacts electrically in series with the intermediate ones of the timing cam contacts, whereby precise timing is obtained with fewer precision parts.

9. A keyboard operated telegraph transmitter comprising an array of keys, notched parallel code bars shiftable by depression of a key, a limited rotation clutch driving a plurality of coaxial timing cams, means whereby depression of a key engages said clutch, a plurality of code levers disposed for cooperation with said cams and code bars, each code lever cooperating with a mating code bar, electrical contacts controlled by said code levers, the timing cams being rotatably displaced relative to one another, the arrangement being such that operation of an electrical contact requires the favorable coincidence of a timing cam and a code bar, said timing cams providing a rough exaggerated timing in which the intelligence bits are too long, an additional master pulse cam having lobes of precision length to provide proper timing in which the intelligence bits are of correct length, there being a plurality of such lobes for cooperation with said plurality of timing cams, means connecting said master pulse cam and said timing cams together so that said master pulse cam is turned by said clutch along with said timing cams, and an accurately adjustable precision contact operated by said master pulse cam, and means connecting said precision contact electrically in series with the aforesaid timing cam contacts, whereby precise timing is obtained with fewer precision parts.

10. A keyboard operated telegraph transmitter comprising an array of keys, notched parallel code bars shiftable by depression of a key, a limited rotation clutch driving a plurality of coaxial timing cams which operate transmission contacts in cooperation with said keys, means whereby depression of a key engages said clutch, a plurality of code levers disposed for cooperation with said cams and code bars, each code lever cooperating with a mating code bar, electrical contacts controlled by said code levers, the timing cams being rotatably displaced from one another, the arrangement being such that operation of an electrical contact requires the favorable coincidence of a timing cam and a code bar, said timing cams providing a rough exaggerated timing in which the intelligence bits are too long, an additional master pulse cam having high dwell portions and low dwell portions occupying end to end substantially the entire periphery of the cam and being substantially equal in length for substantially equal marking and spacing intelligence bits, said master pulse cam being turned by said clutch along with said timing cams, two accurately adjustable precision contacts, and means whereby the high dwell portions of said master pulse cam operate one precision contact and the low dwell portions of the master pulse cam operate the other precision contact, means connecting one of said precision contacts electrically in series with alternate ones of the timing cam contacts, and means connecting the other of said precision contacts electrically in series with the intermediate ones of the timing cam contacts, whereby precise timing is obtained with fewer precision parts.

References Cited in the file of this patent

UNITED STATES PATENTS

| | | |
|---|---|---|
| 1,545,276 | Pfannenstiehl | July 7, 1925 |
| 1,599,514 | Connery | Sept. 14, 1926 |
| 1,820,499 | Salmon | Aug. 25, 1931 |
| 1,224,357 | Griffith | Aug. 29, 1933 |
| 1,994,949 | Huebner et al. | Mar. 19, 1935 |